United States Patent [19]

Hindin et al.

[11] 4,342,265
[45] Aug. 3, 1982

[54] CONVERTIBLE RAIL-HIGHWAY SEMI-TRAILER AXLE LIFTING AND RETAINING MECHANISM

[75] Inventors: Eugene Hindin, Bala Cynwyd, Pa.; Alan R. Cripe; Christopher A. Cripe, both of Richmond, Va.

[73] Assignee: Bi-Modal Corp., Greenwich, Conn.

[21] Appl. No.: 125,507

[22] Filed: Feb. 28, 1980

[51] Int. Cl.³ .......................... B60F 1/04; B61D 3/00; B61F 13/00; B62D 6/12
[52] U.S. Cl. ................... 105/215 C; 105/453
[58] Field of Search ............................ 105/215 C, 453

[56] References Cited

U.S. PATENT DOCUMENTS

| 1,938,049 | 12/1933 | Serrano | 105/215 C |
|---|---|---|---|
| 2,030,311 | 2/1936 | Messick | 105/215 C |
| 2,039,489 | 5/1938 | Messick | 105/215 C |
| 2,889,785 | 6/1959 | Browne | 105/215 C |
| 2,925,791 | 2/1960 | Browne et al. | 105/215 C |
| 3,002,469 | 10/1961 | Wanner | 105/215 C |
| 3,286,657 | 11/1966 | Browne | 105/215 C |
| 3,342,141 | 9/1967 | Browne | 105/215 C |
| 4,202,277 | 5/1980 | Browne et al. | 105/215 C |

Primary Examiner—Joseph F. Peters, Jr.
Assistant Examiner—Howard Beltran
Attorney, Agent, or Firm—Max R. Millman

[57] ABSTRACT

In a convertible rail-highway semi-trailer a mechanism for lifting and retaining a rail wheel-set axle unit or bogie in an elevated stored position in the highway mode when the highway wheels engage the ground. The mechanism includes hooks pre-set to engage the bogie when the body has been lowered and to retain the bogie as the body rises when the air springs of the highway wheel-set axle unit are inflated to convert from the rail to highway mode. The mechanism also includes a device to keep the hooks disengaged from the rail bogie when the air springs of the rail bogie are inflated and the flanged railroad wheels engage the tracks and the highway wheels are in an elevated inoperative position. The mechanism is also provided with a valve device to prevent inflation of the rail bogie air springs when the latter is in its elevated stored position.

13 Claims, 8 Drawing Figures

CONVERTIBLE RAIL-HIGHWAY SEMI-TRAILER AXLE LIFTING AND RETAINING MECHANISM

This is related to copending application, Ser. No. 810,120, filed June 27, 1977, now U.S. Pat. No. 4,202,277 which is directed to a convertible rail-highway semi-trailer.

Said related application covers a body which is supported by air springs on a rail wheel-set axle unit and on a highway wheel-set axle unit adjacent the rear of the body, these units being connected to the body independently of each other, and valves and conduits interconnecting a source of compressed air with the air springs to selectively inflate and deflate the air springs and thereby raise the rail wheel-set axle unit into an elevated inoperative position and lower the highway wheel-set axle unit into ground-engaging position for the highway mode and vice versa, a mechanism to lift and retain the rail wheel-set axle unit in its elevated stored inoperative position in the highway mode and a mechanism to lift and retain the highway wheel-set axle unit in its elevated stored inoperative position in the rail mode wherein the flanged rail wheels are in the track-engaging position.

The instant invention relates to the mechanism to lift and retain the rail wheel-set axle unit in its elevated stored inoperative position while the highway wheels engage the ground for the highway mode of travel.

The lifting and retaining mechanism for the rail wheel-set axle unit or bogie shown and described in said related application comprises a cable and spring combination, the spring being under compression and the cable relaxed when the flanged railway wheels engage the tracks in the rail mode. When the air springs of the rail bogie are deflated and those of the highway wheel-set axle unit are inflated, the spring previously under compression expands and applies tension to the cable which lifts the rail wheel-set axle unit or bogie to its elevated stored position. This necessitates the use of a spring of very high rating, in the order of magnitude of about 3,000 lbs., to counter-balance the weight of the rail bogie.

The primary object of this invention is to replace the lifting and retaining mechanism of said related application, as above described, with a mechanism which is simpler in construction and operation, more effective and more positive in its lifting and retaining action.

Another object of the invention is to provide a rail bogie lifting and retaining mechanism which employs hooks to engage brackets secured to the rail bogie. Thus, when going from the rail to the highway mode, the air springs of the rail bogie are deflated until the body settles down at which point the hooks engage the rail bogie brackets. Inflation of the highway air springs thus raises the body and the rail bogie which is retained in the elevated position by the hooks.

Another object of the invention is to provide a rail bogie lifting and retaining mechanism of the character above described including valve controls to prevent inflation of the rail bogie air springs while the hooks are engaged with the bogie brackets.

Yet another object of the invention is to provide a rail bogie lifting and retaining mechanism including a device whereby the hooks are retained in a pre-set condition to automatically engage the bogie when the body has been fully lowered and the highway air springs are ready to be inflated to convert to the highway mode so that when the highway air springs are inflated the body will be raised and will carry with it the rail bogie to be retained therewith in the inoperative storage position.

These and other objects of the invention will become more apparent as the following description proceeds in conjunction with the accompanying drawings, wherein:

Specific reference is now made to the drawings in which similar reference characters are used for corresponding elements throughout.

Figure 1:
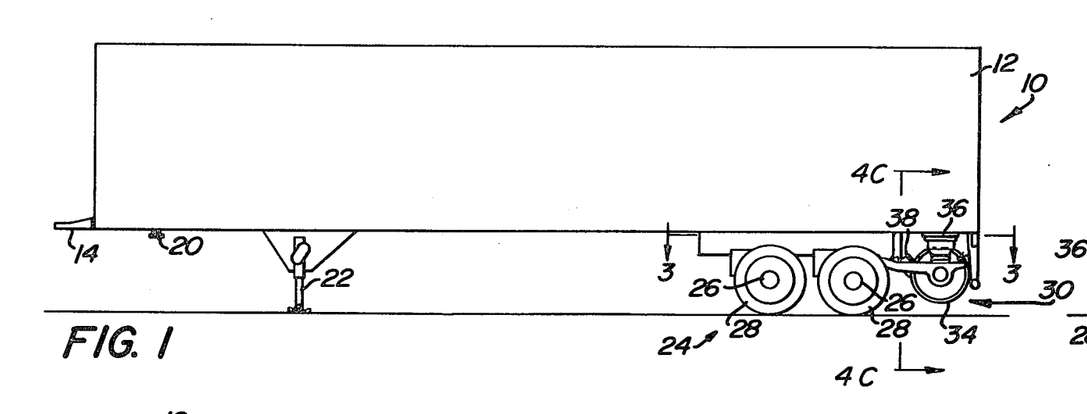
FIG. 1 is a diagrammatic side elevational view of the vehicle shown ready to be coupled to a tractor for the highway mode operation.
Figure 1A:
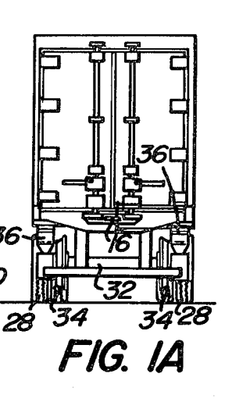
FIG. 1A is a rear elevational view of the vehicle in the highway mode.
Figure 2:
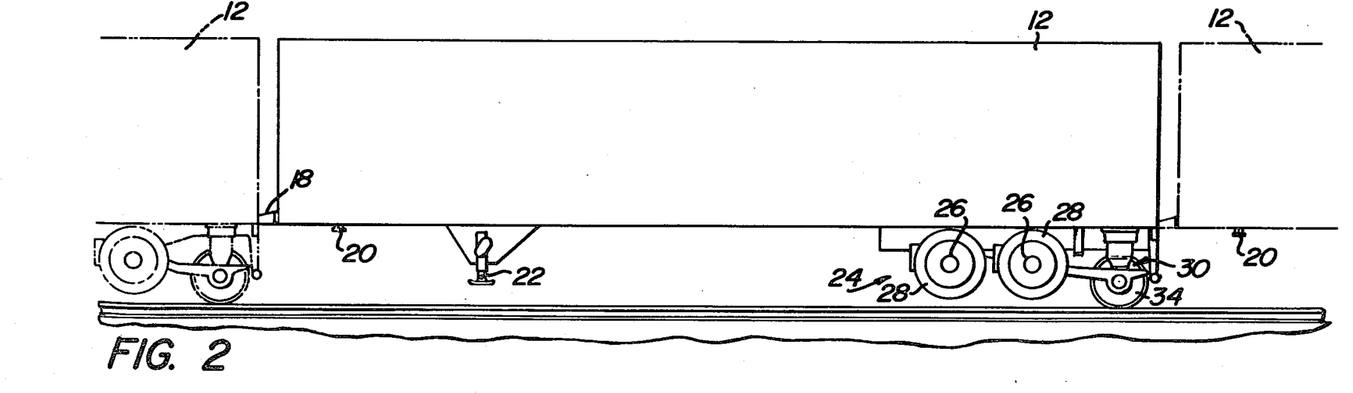
FIG. 2 is a view similar to FIG. 1 of the vehicle in the railway mode operation with the vehicles coupled end to end to form a train.

Referring first to FIGS. 1, 1A and 2, the present vehicle is generally shown at 10 and includes a body 12 of conventional semi-trailer dimensions which could be 45 ft. long, having a male coupling member 14 at its front end, and a female member 16 at its rear end to receive the male coupler of an adjacent body as at 18 to form a train for the railroad mode of operation, as seen in FIG. 2. The vehicle also includes a conventional kingpin 20 adjacent its front end for removable coupling to the fifth wheel of a tractor for the highway mode of operation, conventionally placed, telescoping semi-trailer landing gears 22, highway running gear 24 including tandem axles 26 (although a single axle suspension can be used) each axle mounting dual tired wheels 28, the running gear being suspended from the sub or underframe of the body towards the rear thereof by air-springs later to be described, the same constituting a highway wheel-set axle unit; and a railroad bogie or rail wheel-set axle unit 30, to be described in detail later, which includes a single axle 32 mounting a pair of flanged railroad wheels 34, at appropriate rail spacing transversely, the bogie being suspended by air-springs 36 from the vehicle body behind the highway running gear 24 and including a braking mechanism 38. The arrangement is such that by appropriate operation of a pneumatic mechanism, to be described hereinafter, the air springs suspending the highway running gear may be inflated to lower the highway wheels 28 into engagement with a paved road while the air springs 36 of the railroad bogie are deflated so that the rail wheel-set axle unit or bogie may be raised into an elevated inoperative stored position as seen in FIG. 1, and by reversing this operation, the flanged railroad wheels 34 can be lowered to engage the track while the highway wheel-set axle unit is raised into an elevated inoperative stored position as shown in FIG. 2. In this latter railroad mode, the vehicle may be coupled as at 18 end to end to form a train to be pulled by a suitable locomotive. It will be understood that in the highway mode, when the highway wheels 28 engage the road and the flanged railroad wheels 34 are in the raised stored position, the landing gear 22 is in the load supporting position during which time a conventional tractor is coupled to the kingpin 20, the landing gear is telescoped to a raised position and the vehicle will then be driven as an over-the-road tractor-semi-trailer combination. The air bags supporting the body on the highway wheel-set axle unit are shown diagrammatically at 39 in FIG. 3 and are fully described in said related application Ser. No. 810,120, now Pat. No. 4,202,277.

Figure 4:
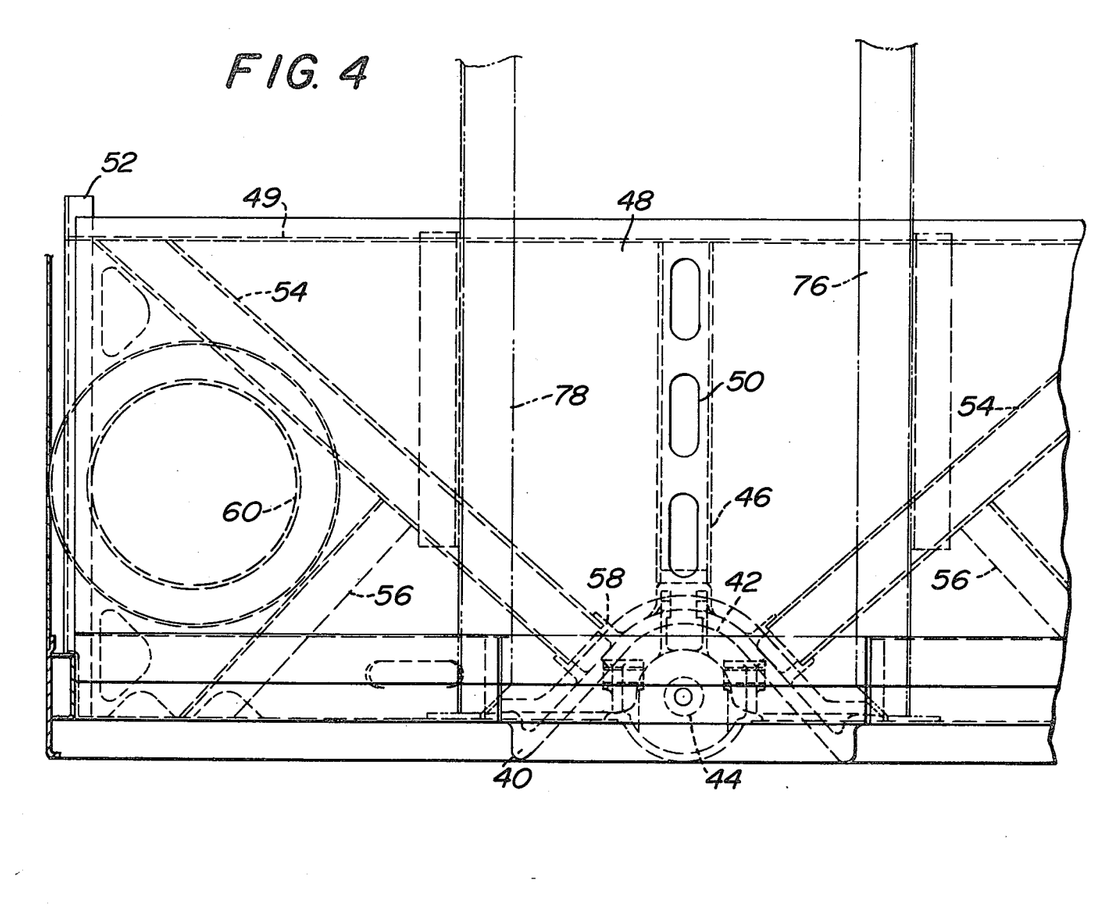
FIG. 4 is a partial enlarged plan view of a portion of the rear sill construction.

The rear sill structure shown in FIG. 4 includes a central casting 40 of generally "T" shape when viewed from the rear, a horizontal hole or slot terminating in an arcuate wall 42 adapted to receive the male coupling member extending from the front of an adjacent vehicle, a vertical bore 44 intercepting the slot adapted to receive a coupler locking pin and other parts required to accommodate the coupler pin and locking mechanism.

Extending longitudinally from the casting 40 and secured thereto as by welding is a web member 46 shown here as a channel. The upper or top plate 48 which extends the full width of the vehicle and about 36 in. into the same is welded to the top of the channel member 46 through openings 50. Extending longitudinally on both sides of the rear sill structure for bolting to the median portion of the side rail are side channel members 52, the side edges of top plate 48 being welded thereto along the top flanges of said side channels.

A bottom plate 51 is provided which is substantially coextensive with the top plate 48 and which is spaced vertically therebeneath, the bottom plate being welded to the bottom of the central channel member 46 and to the bottom flanges of the side channel members 52 and to a vertical web member 49 at its forward edge. Thus, the top and bottom plates form, in effect, a sandwich between which are welded diagonal braces 54 and 56, the diagonal braces 54 being secured at their outer ends as at 58 to the casting 40.

Inboard of and adjacent each side of the vehicle, there is a suitable opening 60 in the bottom plate 51. It is at these two locations that the air spring assemblies 36 of the railroad bogie 30 are connected to the body structure.

Figure 3:
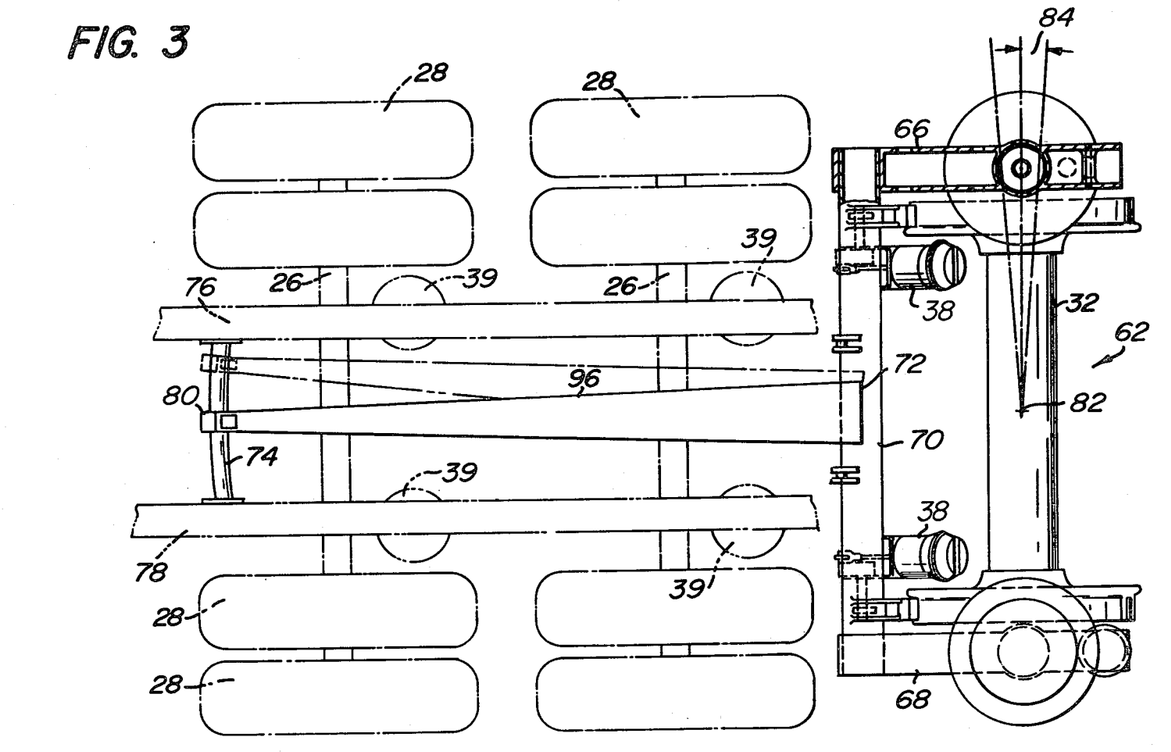
FIG. 3 is an enlarged horizontal sectional view taken from the line 3—3 of FIG. 1.

The bogie 30 which is shown in detail in FIG. 3 comprises a yoke 62 and a longitudinally extending tubular tongue 64 which is angulated so that its forwardly extending portion overlies and clears the highway wheel axles 26. The yoke comprises transversely spaced longitudinal forwardly extending side members 66 and 68, preferably of cast hollow rectangular configuration which are connected at their forward ends by a transversely extending tubular member 70. The tongue 96 is welded to the transverse tubular member of the yoke as at 72 centrally thereof. The member 70 mounts a suitable brake mechanism 38 for each railroad wheel.

At the location of the forward end of the tongue 96, which is about 10 ft. long, an arcuate tube 74 is secured to the running gear channels 76 and 78 of the vehicle extending transversely therebetween. The forward end of the tongue is provided with a split collar 80, retained by bolts. Thus, the bogie is allowed to self steer as the front end of the tongue is allowed to slide from side to side on the arcuate tube 74 so that the rail axle 32 is free to rotate about a vertical axis 82 at its center. The steering angle is limited by the length of the arcuate member 74 and is shown in phantom in FIG. 3 as 84. When the railroad brakes are applied, the arcuate tube 80 supplies the longitudinal restraint, and also the vertical restraint to the forces produced by the brake torque. It will be understood that the arcuate tube 74 may be of any suitable cross-section.

Figure 4C:
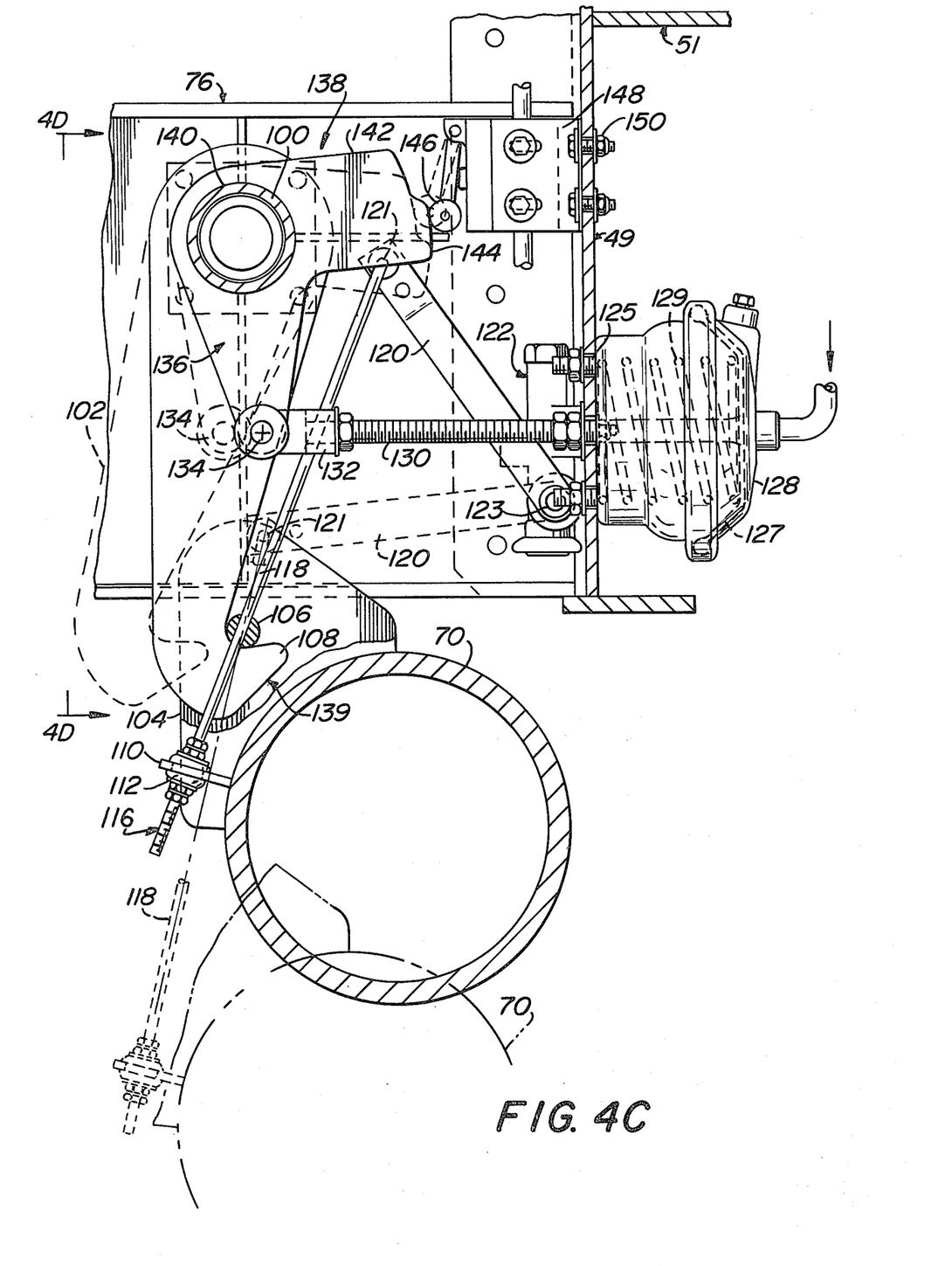
FIG. 4C is a sectional view taken on the line 4C—4C of FIG. 1.
Figure 4D:
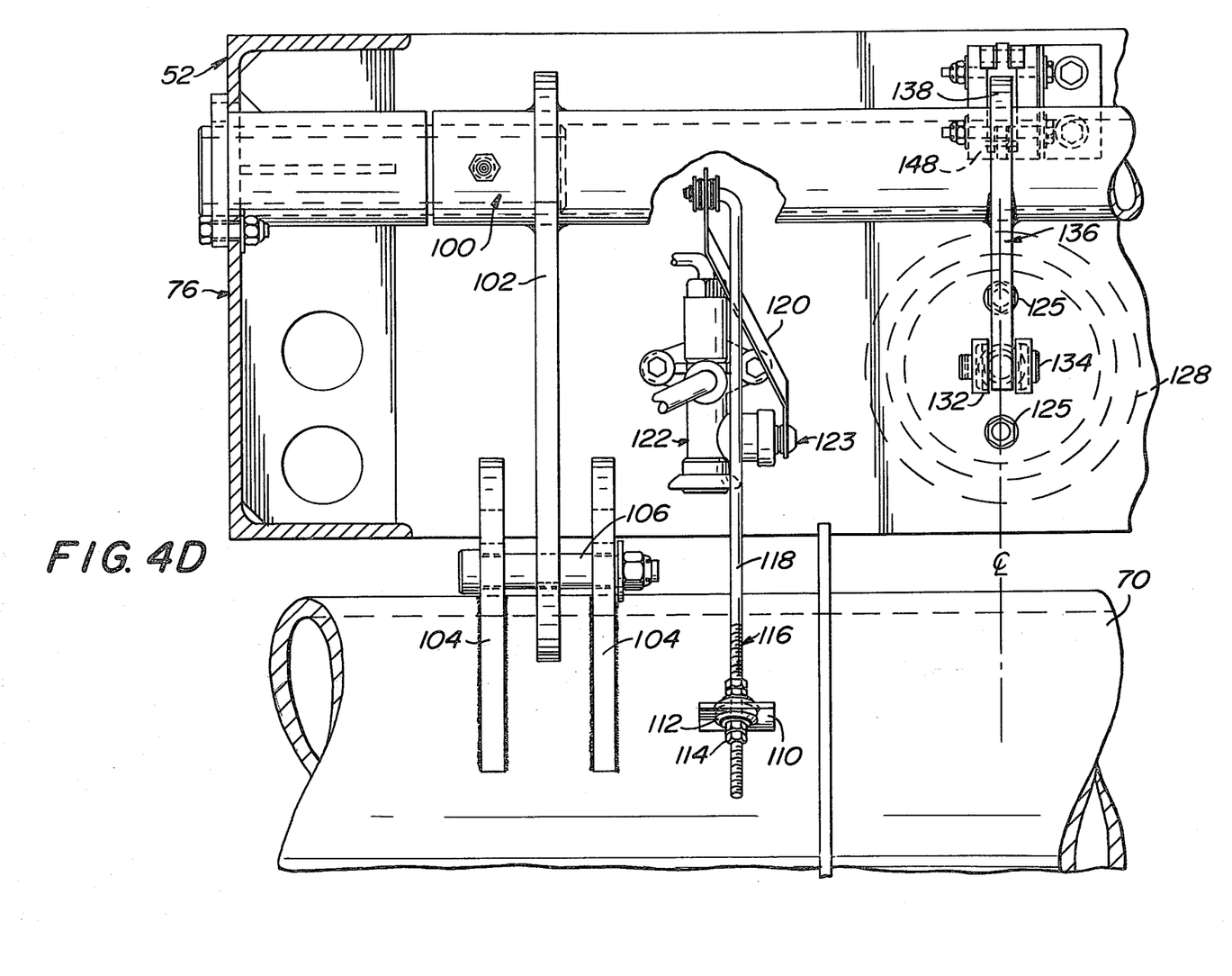
FIG. 4D is a sectional view taken on the line 4D—4D of FIG. 4C.

Reference is now made to FIGS. 4C and 4D where the lifting and retaining mechanism of the instant invention is shown in detail. Rotatably mounted on the longitudinal running gear channels 76 and 78 on the underside of the vehicle body and above the cross tube 70 of the bogie yoke member 62 is a transverse tube 100. Welded to the tube 100 and rotatable therewith are a pair of transversely spaced downwardly extending hook members 102 with rearwardly extending hook ends 108. Welded to the cross tube 70 are transversely spaced pairs of lugs 104 which mount transversely extending shoulder bolts 106 between them engageable by the hook end 108 of each hook member 102.

Connected to the tube 70 at a projecting lug 110 by means of grommets 112 and lock nuts and washers 114 is the threaded end 116 of an operating rod 118 whose other end is pivotally connected as at 121 to one end of a lever arm 120 which is pivotally connected to height control valve 122 at shaft 123 and selectively opens and closes the valve.

Mounted as at 125 to the vertical web 49 of the rear sill structure of FIG. 4 of the vehicle underframe is a mechanico-pneumatic brake chamber 128. The chamber includes a diaphragm 127 and a spring 129 which is operatively connected to a threaded piston rod 130 upon which is secured a yoke 132 which mounts a pin 134 which is in turn secured to the arm 136 of a bell crank 138 which is fixed at its corner as at 140 to the rotatable tube 100, the other arm 142 of which also has a cam surface 144 which actuates a roller 146 which is connected to a roller-lever-operated 2-way valve 148 and which is also mounted as at 150 on the vertical web member 49. The action of the brake chamber 128 is such that when air is admitted into it behind the diaphragm 127, the spring 129 will be compressed and the push rod 130 will be extended whereas when air is removed from the chamber, the previously compressed spring will expand and retract the rod 130.

In operation, to convert the vehicle from the rail mode to the highway mode, the mode selector valve MSV is moved first to a transfer position which actuates the quick release valve RV whereby air is vented from the rail air bags whereupon the vehicle body settles. This shortens the distance between the body and the bogie, i.e. between the tube 100 and cross tube 70, moving the operating rod from the phantom to the solid line position of FIG. 4C thereby opening height sensing valve 122, though in the rail to highway conversion this has no function.

As the body approaches its lowest position, the hooks 102 are in their solid line position, being held there by the spring 129 in brake chamber 127 which is pulling the rod 130 urging the entire assembly consisting of bell crank 138, tube 100, and hooks 102 in a counter-clockwise direction. As the bottom surface 139 of hooks 102 comes into contact with shoulder bolts 106, the hooks are cammed into a clockwise rotation until they can slide into an engaging position under bolts 106, rotating counter-clockwise under the urging of spring 129.

Figure 5:
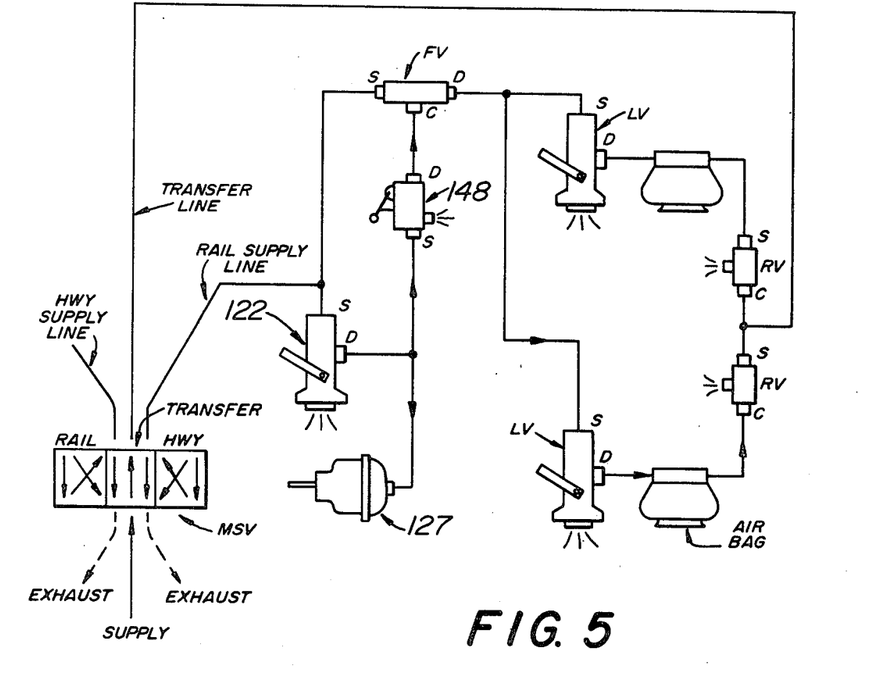
FIG. 5 is a diagram of the air circuit for operating the instant invention.

Now, when the highway air bags 39 are inflated by moving the mode selector valve MSV to the highway position, the hooks retain the rail wheel-set axle unit in its elevated stored position. In this position the cam 144 acting on the roller 146 keeps valve 148 open and control rod 118 keeps control valve 122 open. These two valves are a safety device to prevent inflation of the rail air bags while the hooks are engaged under the shoulder bolts. As long as valve 148 has its operating lines in the solid line position, it is open (allowing air to flow through), and as long as valve 122 has its operating arm 120 in the solid line position, it is also open. Air to inflate the rail air bags must flow through the "rail" supply line through feed valve FV to the levelling valves LV and thence to the air bags. However, as long as air pressure is present at the control port of feed valve FV, it remains closed, not permitting air to flow to the air bags. Since valves 122 and 148 are both open as long as hooks 102 are engaged, no air can flow to the air bags.

In the reverse conversion from the highway mode to the rail mode, the mode selector valve is moved from "highway" to "transfer", causing deflation of the highway air bags allowing the body to settle until the railroad wheels are on the tracks.

The mode selector valve is now moved to "rail" position directing air through the "rail" supply line to both the feed valve FV where it is momentarily blocked and to valve 122 from which it is delivered through valve 148 to the control port of FV and at the same time to brake chamber 127 which now pushes hooks 102 out of engagement with shoulder bolts 106 and simultaneously rotates cam surface 144 clockwise allowing valve 148 to close. This now permits air to flow through FV and levelling valves LV to the air bags, causing the body to rise. Since cross-tube 70 remains down while the body rises, control rod 118 and valve operating arm 120 go to the dotted line position, at which time valve 122 closes off its supply port and vents the chamber 127 to atmosphere allowing spring 129 to return bell crank 138 and hooks 102 to the solid line position, ready for the next cycle.

In FIG. 5, S is supply, D is delivery, C is control and ⊁[ is exhaust. MSV is a 3-position, 6-way, lever-operated valve; 122 is an adjustable position, 3-way, lever-operated valve; 148 is a 2-position, 3-way, lever-operated valve; LV is an adjustable position, 3-way, lever-operated valve; FV is a 2-position, 2-way, pilot-operated valve and RV is also a 2-position, 2-way, pilot-operated valve.

What is claimed is:

1. In a convertible rail-highway semi-trailer including a body, a rail wheel-set axle unit and air spring means supporting the body, a highway wheel-set axle unit and air spring means supporting the body on the highway wheel-set axle unit independently of the rail wheel-set axle unit; a mechanism for lifting and retaining the rail wheel-set axle unit in the elevated stored position in a highway mode when the highway wheels engage the ground and to release said rail wheel-set axle unit upon conversion from the highway mode to a rail mode, said mechanism comprising at least one hook member, means rotatably mounting said hook member to the underside of the body for movement into and out of engagement with a part of the rail wheel-set axle unit, actuating means operatively connected to said hook member causing engagement of said hook member with said rail wheel-set axle unit in response to a deflation of the rail air spring means and selectively to release said engagement in response to an inflation of said rail air spring means and means to prevent air from inflating said rail air spring means while said hook member is engaged with said rail wheel-set axle unit.

2. The combination of claim 1 wherein said rail wheel-set axle unit includes a cross tube and a means fastened to said cross tube and engageable by said hook member.

3. The combination of claim 1 wherein said actuating means includes an air cylinder, a piston rod operatively connecting said cylinder to said hook member, means selectively admitting and removing air from said cylinder whereby removal of air from said cylinder causes said piston to pull said hook member into engagement with said rail wheel-set axle unit and admission of air to said cylinder causes said piston rod to push said hook member out of engagement with said rail wheel-set axle unit.

4. The combination of claim 3 wherein said air cylinder includes a diaphragm and spring, said spring being connected to said piston rod, whereby air removed from said cylinder behind said diaphragm will allow said spring to expand and pull said piston rod and said hook member into the engaged position, and admission of air behind said diaphragm will compress said spring and push said piston rod and hook member into a disengaged unhooked position.

5. In a convertible rail-highway semi-trailer including a body, a rail wheel-set axle unit and air spring means supporting the body, a highway wheel-set axle unit and air spring means supporting the body on the highway wheel-set axle unit independently of the rail wheel-set axle unit; a mechanism for lifting and retaining the rail wheel-set axle unit in the elevated stored position in a highway mode when the highway wheels engage the ground and to release said rail wheel-set axle unit upon conversion from a highway mode to a rail mode, said mechanism comprising at least one hook member, means rotatably mounting said hook member to the underside of the body for movement into and out of engagement with a part of the rail wheel-set axle unit, and actuating means operatively connected to said hook member causing engagement of said hook member with said rail wheel-set axle unit in response to a deflation of the rail air spring means and selectively to release said engagement in response to an inflation of said rail air spring means, said actuating means including an air cylinder, a piston rod operatively connecting said cylinder to said hook member, means selectively admitting and removing air from said cylinder whereby removal of air from said cylinder causes said piston to pull said hook member into engagement with said rail wheel-set axle unit and admission of air to said cylinder causes said piston rod to push said hook member out of engagement with said rail wheel-set axle unit, said means selectively admitting and removing air from said cylinder including a valve operatively connected to said chamber and means opening and closing said valve in response to the distance between the body and the rail wheel-set axle unit.

6. The combination of claim 5 wherein said means opening and closing said valve includes an operating rod secured adjacent one of its ends to the rail wheel-set axle unit and a lever terminally pivoted to said valve and the other end of said operating rod.

7. The combination of claim 5 and a 2-way valve including a roller-lever actuator therefor and operatively connected to said first-mentioned valve, and means engaging said roller-lever valve actuator and acting to open and close said second valve, said valves acting in combination to prevent inflation of said rail air bags while said hook member engages said rail wheel-set axle unit.

8. The combination of claim 7 wherein said means rotatably mounting said hook member includes a rotatably mounted shaft upon which said hook member is affixed, and said means engaging said roller-lever valve actuator includes a bell crank fixed to said shaft and connected to said piston rod, said bell crank including a cam engaging said roller-lever valve actuator.

9. In a vehicle having a body, a wheel-set axle unit and air bags supporting said body; a mechanism for lifting and retaining said wheel-set axle unit in an elevated stored position when said air bags are deflated comprising at least one hook member, means rotatably mounting said hook member to the underside of said body and engageable with a part of said wheel-set axle unit, an air cylinder, a piston rod interconnecting said cylinder and said hook member, a valve operatively connected to said cylinder and means responsive to the distance between said body and said wheel-set axle unit causing said valve to selectively open and close to admit air into and remove air from said cylinder and thereby pull said piston rod and hook member into an engaged lifting and retaining position and push said piston and hook member into a retracted position.

10. The combination of claim 9 wherein said means causing said valve to open and close includes an operating rod secured adjacent one of its ends to said wheel-set axle unit and a lever terminal pivoted to said valve and the other end of said operating rod.

11. The combination of claim 9 wherein said air cylinder includes a diaphragm and spring, said spring being connected to said piston rod, whereby air removed from said cylinder behind said diaphragm will allow said spring to expand and pull said piston rod and said hook member into the engaged position, and admission of air behind said diaphragm will compress said spring and push said piston rod and hook member into a disengaged unhooked position.

12. The combination of claim 9 and a 2-way valve including a roller-lever actuator therefor and operatively connected to said first-mentioned valve, and means engaging said roller-lever valve actuator and acting to open and close said second valve, said valves acting in combination to prevent inflation of said rail air bags while said hook member engages said rail wheel-set axle unit.

13. The combination of claim 12 wherein said means rotatably mounting said hook member includes a rotatably mounted shaft upon which said hook member is affixed, and said means engaging said roller-lever valve actuator includes a bell crank fixed to said shaft and connected to said piston rod, said bell crank including a cam engaging said roller-lever valve actuator.

* * * * *